United States Patent [19]

Watkins et al.

[11] Patent Number: 4,923,572
[45] Date of Patent: May 8, 1990

[54] IMAGE TRANSFER TOOL

[75] Inventors: John Watkins, Independence; Ramon Magee, Blue Springs; Arthur Doerflinger, Kansas City, all of Mo.

[73] Assignee: Hallmark Cards, Incorporated, Kansas City, Mo.

[21] Appl. No.: 251,174

[22] Filed: Sep. 29, 1988

[51] Int. Cl.⁵ .............................................. C25D 1/10
[52] U.S. Cl. ...................................................... 204/6
[58] Field of Search ............................................ 204/6

[56] References Cited

U.S. PATENT DOCUMENTS

| | | | |
|---|---|---|---|
| 2,749,294 | 6/1956 | Winstead | 204/6 |
| 3,565,978 | 2/1971 | Folger | 204/6 |
| 4,478,769 | 10/1984 | Pricone | 204/4 |
| 4,486,363 | 12/1984 | Pricone | 264/1.6 |

Primary Examiner—T. M. Tufariello
Attorney, Agent, or Firm—Neuman, Williams, Anderson & Olson

[57] ABSTRACT

A generally cylindrical image embossing tool which can be used for embossing a web of material in continuous manner is made by placing an image or pattern which is to be replicated onto an embossable material maintained in the form of a cylinder. An electroform in generally cylindrical form corresponding to the image or pattern to be replicated is formed from the imaged embossable material and the electroform is supported on a rigid cylindrical support to form the image transfer tool.

A novel imaging tool has a curved stamping surface carrying an embossed image or pattern. The radius of curvature of the stamping surface matches the radius of curvature of a cylindrical surface which is to be stamped so as to transfer the image or pattern which is to be replicated.

15 Claims, 2 Drawing Sheets

IMAGE TRANSFER TOOL

BACKGROUND OF THE INVENTION

This invention relates to replication of images or patterns and more particularly to an image transfer tool for the replication of images.

The continuous embossing of sheet or web materials to imprint thereon a desired image or pattern is widely practiced. Belt type embossing tools and rigid cylindrical rolls have been used for the continuous embossing of webs of material such as polymeric and thermoplastic or thermosetting resins. Generally the master used to transfer the image to be replicated is in planar form and several assembled masters are required to produce an image pattern over the entire surface of the cylindrical tool. For example, U.S. Pat. No. 4,478,769 relates to a thin, flexible, generally cylindrical embossing tool useful for continuous embossing of a web of material with a pattern having sharp angles and flat faces. The embossing tool of this patent is prepared by assembling a contiguous cluster of master elements, replicating the cluster to provide a number of flexible strips, assembling the assembled strips to provide a cylinder and replicating the cylinder to provide a master cylinder. The master cylinder is then replicated to produce a relatively thick mother cylinder which is then replicated to produce a relatively thin, flexible and generally cylindrical embossing tool.

Such known embossing tools, when used to emboss large areas of sheet material, have seams or gaps which detract from the appearance of the replications. The gaps appear at the junction lines of the several masters used to impart the image over the surface of the tool.

OBJECTS OF THE INVENTION

It is an object of this invention to provide a method for producing an image transfer tool in the shape of a cylinder which has an embossed monolithic pattern or image on its surface.

It is a further object of this invention to provide a process for making a cylindrical image transfer tool which process of manufacture does not involve nesting together a plurality of images or clusters of images in the form of a cylinder.

It is another object of this invention to provide a process for making a cylindrical image transfer tool by forming an image or pattern directly on a curved surface.

It is also an object of this invention to provide an improved image transfer tool having a surface which is entirely optically active.

It is another object of this invention to provide an image transfer tool in cylindrical form having a monolithic pattern or image on its surface.

Another object of this invention is to provide a stamping tool for embossing an image or pattern directly on a curved surface.

SUMMARY OF THE INVENTION

The present invention involves a method of producing a generally cylindrical image transfer or embossing tool by imparting an image or pattern which is to be replicated onto a seamless embossable material maintained in the form of a cylinder. An electroform in generally cylindrical form corresponding to the image or pattern to be replicated is formed from the imaged embossed material and the said electroform supported on a carrier forms the image transfer or embossing tool.

In accordance with one presently preferred embodiment of the invention, a generally cylindrical image transfer or embossing tool which can be used for embossing a web of material in continuous manner is made by placing in conforming relationship a seamless coating or layer of an embossable material around the exterior surface of a rigid cylinder. A desired image or pattern is stamped over substantially the entire exposed surface of the embossable material supported by the rigid cylinder. An electroform of the stamped image is then made by electrodeposition of a metal such as nickel thereon and a reinforcement layer is applied over the image electroform. Then the rigid cylinder is removed to leave, in the form of a cylinder, an image carrier of the embossed layer, the electroformed image and the reinforcement layer. The embossed layer is stripped from the cylindrical electroformed image carrier resulting in a plating mandrel of the electroformed image and reinforcement layer. A second electroform is then made by electrodeposition of a metal on the first imaged electroform which is on the interior of the plating mandrel. The second imaged electroform is removed from the plating composite and can be used to emboss webs of material in continuous manner.

The present invention also involves a novel tool for stamping on a curved surface an image or pattern which is to be replicated. The novel stamping tool has a curved stamping surface carrying an embossed image or pattern. The radius of curvature of the stamping surface matches the radius of curvature of a cylindrical surface which is to be stamped so as to transfer the image or pattern which is to be replicated.

DESCRIPTION OF THE PREFERRED EMBODIMENTS OF THE INVENTION

Figure 1:
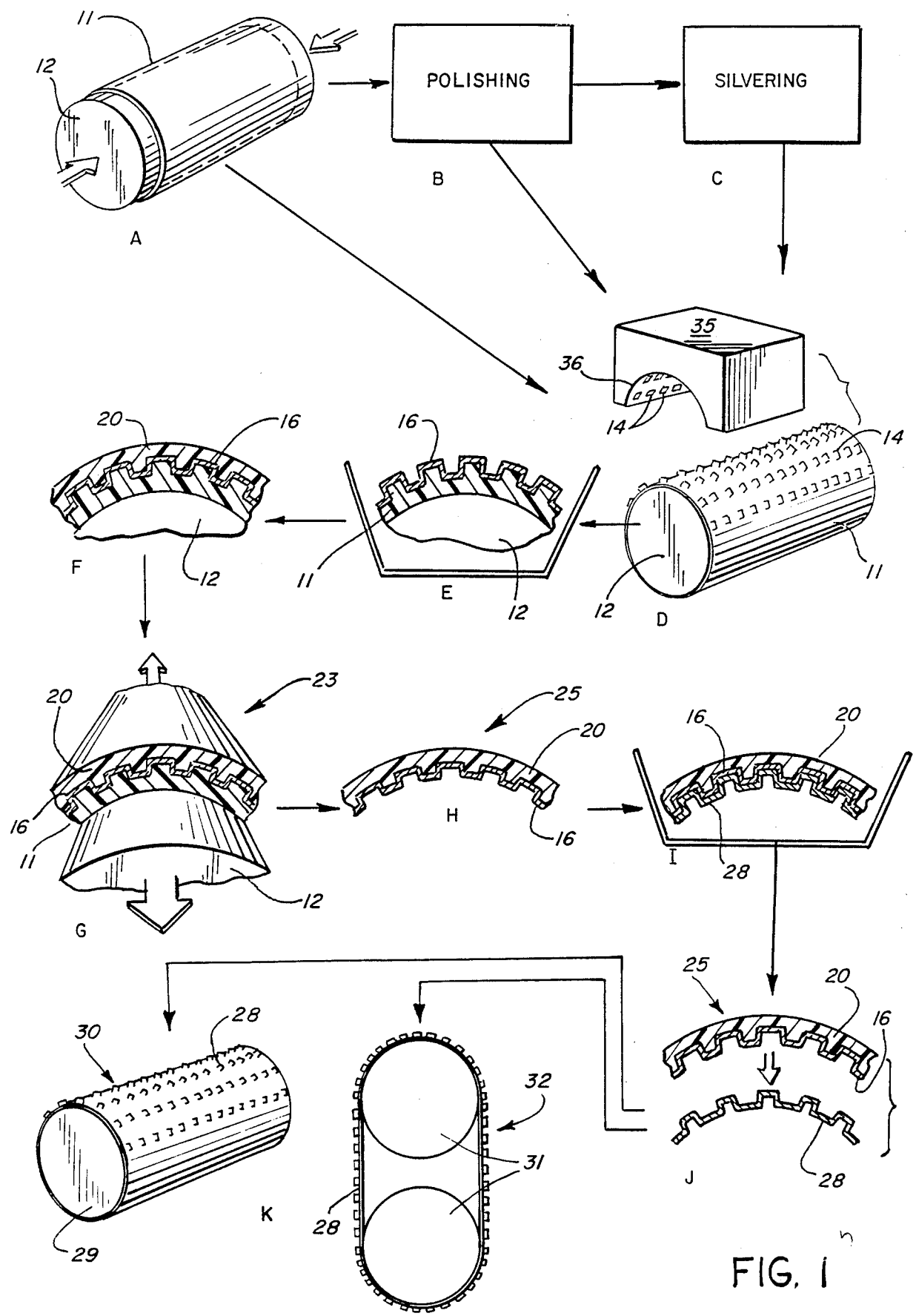
FIG. 1 is a diagrammatic flow chart illustrating the various steps in producing a cylindrical embossing tool in accordance with one preferred embodiment of the present invention.

A preferred method of producing an embossing tool in accordance with the invention will now be described with reference to the drawings. Referring to FIG. 1, in Step A a coating or a seamless layer of an embossable material 11 of a polymeric or plastic material is placed as a sleeve snugly around a rigid, such as a steel, cylinder 12. The length and circumference of rigid cylinder 12 can be varied to produce a final image transfer or embossing tool of a desired size which will depend upon the image to be replicated and the size of the web material to be embossed. The embossable material can be a polymer material or a thermoplastic material such as, for example, polyesters, polystyrenes, ABS copolymers, acrylics and the like. The thickness of the embossable layer 11 can vary, but is generally and preferably of a thickness of about $\frac{1}{8}$ to $\frac{1}{2}$ inch.

Placement of the seamless layer of embossable material onto the cylinder can be accomplished in a variety of ways. For example, a thin wall tube of acrylic material of a size which permits it to slip over the cylinder can be used. Heating the acrylic one or more times to a temperature of about 190° F. and permitting it to cool causes the acrylic to shrink over the exterior of said cylinder. The acrylic tube can then be machined and polished to the desired size. Alternately, a seamless layer of embossable material can be placed on the rigid cylinder by dipping the cylinder into a bath of a polymeric resin and permitting the resin to cure and form a layer on the cylinder. One or more dipping operations can be conducted to provide an embossable layer of desired thickness. If necessary or desired, but preferably, the exposed surface of the embossable material layer 11 is polished in Step B to produce a cylindrical shape having a polished surface.

In Step C a thin layer of a metal such as silver can be deposited on the exposed embossable layer 11 to render it electrically conductive and/or optically reflective. Metal deposition at Step C is optional, but is generally beneficial with respect to visual observation of the imaged or patterned surface during the process of manufacture of the embossing tool. The metal layer also serves to provide a release interface.

Whether or not metal deposition is conducted in Step C, a stamping operation is conducted at Step D to place a desired image or pattern 14 over the entire exterior surface of the embossable layer 11. The stamping operation is conducted using an imaging tool or a stamper 35, the stamping surface of which has a curvature corresponding to the curvature of the embossable layer on rigid cylinder 12. A preferred imaging tool will be described in greater detail hereinafter. The temperature, load and dwell time used in the stamping operation can be controlled so as to achieve a desired depth of embossment or penetration of the embossable layer 11. Generally, the degree of penetration of the imaged surface of the stamping tool into the layer is in the range of about 0.0001 to 0.001 inches depending upon the type of image or pattern to be replicated.

After stamping, electroforming is carried out in Step E in known manner to form a nickel electroform 16 on the entire outer surface of the embossable material layer 11. The thickness of electroform 16 is generally on the order of about 0.010 to 0.070 inch. The electroform 16 is an exact negative of the image or pattern which had been stamped on the embossable material layer 11. A reinforcement layer 20 is then applied in Step F over the electroform 16. The reinforcement layer can be composed of an adhesive, epoxy resin, and a filler material, such as fiberglass particles and the like. The reinforcement layer 20 is added to provide greater rigidity and stability and to mask the electroform 16 during a subsequent electroforming operation. This composite is referred to as the image carrier (23) in Step G.

At Step G the rigid cylinder 12 is removed from the image carrier 23. The rigid cylinder 12 can be removed by applying force along its center line and slipping it out of the now rigid reinforced image carrier 23 while preventing movement of the carrier 23. After removal of rigid cylinder 12 at Step G, the image carrier 23 in the shape of a hollow cylinder consists of the embossed layer 11, metal (silver) layer, if employed, (not shown in the drawings), electroform negative image 16 and reinforcement layer 20.

Next, the embossed layer 11 is stripped from the image carrier 23 at Step H, leaving in the shape of a hollow cylinder a plating mandrel 25 having original electroform 16 as the interior component contained by the exterior reinforcement layer 20. Plating mandrel 25 is again electroplated in Step I to deposit an electroform 28 on the interior surface of the plating mandrel 25. The electroform 28 having a thickness of about 0.005 to 0.012 inch and a positive image replica of electroform 16 is then, at Step J, removed from the interior of the plating mandrel. This can be readily accomplished by folding its center appropriately to release it from the plating mandrel and to reduce its diameter.

The imaged electroform 28 suitably carried forms an embossing tool which can be used to emboss webs of embossable materials in continuous manner. For example, the electroform 28 can be placed over a metal carrier cylinder such as an aluminum cylinder 29 having an outer diameter so as to fit snugly within the electroform imaged sleeve 28. The imaged sleeve 28 can be placed over carrier cylinder 29 by introducing air into the interface of the two and then floating the imaged sleeve into its position to form a supported embossing tool 30. Similarly, the imaged electroform 28 can be carried by a plurality of rollers 31 to form an endless belt 32 embossing tool. The embossing tools 30 and 32 comprising the imaged electroform 28 and a carrier therefor are now ready for use to emboss webs of embossable materials in a continuous manner. For example, the embossing tool can be used to transfer images or patterns such as digitally encoded audio and/or video information, to a web of thermoplastic material as described in copending application Ser. No. 887,902, now U.S. Pat. No. 4,190,893, or in other known web embossing methods. The imaged electroform embossing tool 28 can be used advantageously to replicate surface images or patterns such as holograms, diffraction gratings, decorative images and the like.

The plating mandrel 25 can be returned to Step I for electroplating again. In this way, a plurality of embossing tools can be produced.

Important features of the present invention involve stamping the image or pattern which is to be replicated directly onto a curved cylindrical surface so as to avoid the necessity of stamping an image or pattern to be replicated on a planar surface and then converting to a cylindrical shape. When converting a planar pattern to cylindrical shape, gaps or seams are inherently produced in the replications because to do so requires that a plurality of planar images be assembled to make cylindrical segments which are nested together to form a completed cylindrical surface. The size of the gaps depends upon the ability to nest together the segments. However, for images and surface patterns viewed by the human eye discontinuities are noticeable in the assembly.

In accordance with the present invention, the image or pattern to be replicated is stamped directly onto a curved cylindrical surface. To accomplish this desideratum, an imaging tool or stamper 35 having a curved stamping surface is used for the stamping operation. A preferred form of the stamper is illustrated in FIGS. 2-5.

Figure 2:
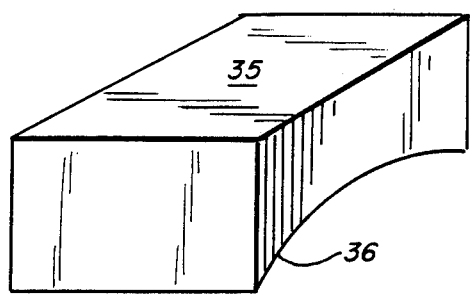
FIG. 2 is a perspective view of a preferred stamping tool for use in accordance with the invention in its initial stage.
Figure 3:
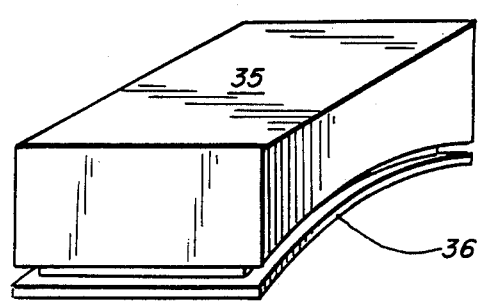
FIG. 3 is a perspective view of the preferred stamping tool of FIG. 2 showing the undercutting thereof.
Figure 4:
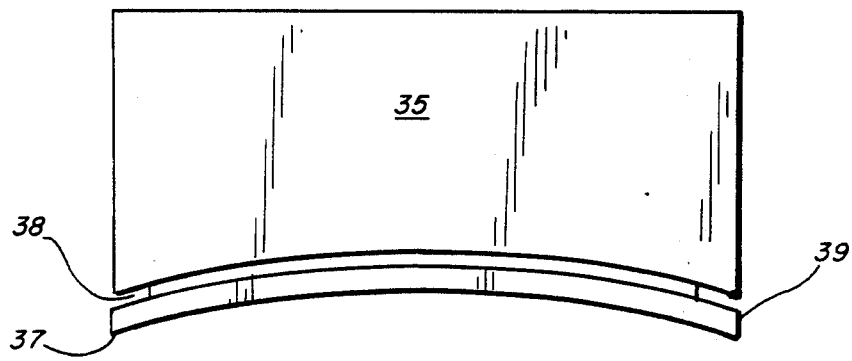
FIG. 4 is a side view of the preferred stamping tool showing its condition after undercutting.
Figure 5:
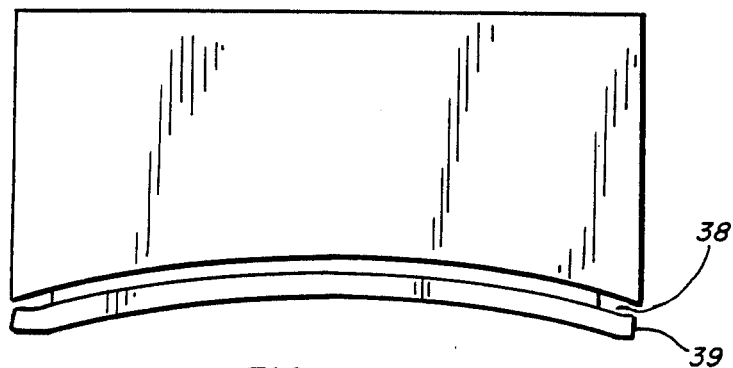
FIG. 5 is a side view of the finished preferred stamping tool for use in accordance with the invention.

FIG. 2 shows a tool 35 which is machined from a nickel electroform having a curved bottom surface 36 carrying an image or pattern 14 which is to be replicated. This imaged bottom surface 36 is not flat, but rather is curved and has a radius of curvature matching that of the embossable material layer 11 which is to be imaged. The size of the stamper 35 can be varied as desired depending on the image or pattern which is to be replicated. Machining of the nickel imaging tool 35 generally leaves a small flaw at the bottom edge of the tool in the form of a minute burr 37 next to the image. This burr 37 extends around the entire perimeter of the stamping tool. If this burr were not removed before imaging, a slight, but noticeable, seam of "optically dead" area would surround each stamp. To overcome this problem, the tool edge is undercut as at 38 as shown in FIGS. 3, 4 and 5. The undercut 38 leaves a small overhang 39 at the edge of the tool which extends approximately 0.050 of an inch (FIG. 4). Undercutting of the tool edge weakens its perimeter along the undercut. The stamping tool is then stressed to bend the overhanging edge of the stamper slightly upward into a more horizontal plane as shown in FIG. 5. Bending of the overhang edge portion 39 upwardly can be accomplished by heating the stamper to a temperature on the order of 250° F. and stamping the embossable material layer 11 with an excessive pressure so as to bend the stamping tool edge 39 very slightly upwardly. This stressing or edge bending operation does not in any way harm the integrity of the image on the tool. Because of this gentle radius at the tool perimeter, each stamp has a gentle fading of the image on the cylinder surface. When successive images are stamped contiguous to one another, overlapping of the stampings provides a smooth transition from one stamping to the next so that the entire stamped surface is optically active.

Those modifications and equivalents which fall within the spirit of the invention are to be considered a part thereof.

What is claimed is:

1. A method of producing a generally cylindrical embossing tool which can be used for embossing a web or sheet of material in a continuous manner which comprises imparting an image or pattern onto a seamless embossable material maintained generally in the form of a cylinder, forming from the imaged embossable material an electroform in generally cylindrical form corresponding to the image or pattern, and supporting the electroform on a carrier.

2. The method of claim 1 wherein the image or pattern is imparted with an imaging tool having a curved image bearing stamping surface of a curvature matching the curvature of the cylindrical seamless embossable material.

3. The method of claim 1 wherein the seamless embossable material is polished prior to imparting an image or pattern thereon.

4. The method of claim 1 wherein prior to imparting the image or pattern a thin layer of metal is applied to the seamless embossable material.

5. The method of claim 4 wherein the metal is silver.

6. The method of claim 1 wherein the electroform is supported on a rigid cylindrical carrier.

7. The method of claim 1 wherein the electroform is supported on a rigid aluminum cylindrical carrier.

8. The method of claim 1 wherein the electroform is supported by a plurality of cylinders.

9. A method of making a generally cylindrical image transfer tool which can be used for embossing a web or sheet of material in continuous manner which comprises:
   placing in conforming relationship a seamless layer of an embossable material around the exterior surface of a rigid cylinder,
   imparting a desired image or pattern over substantially the entire exposed surface of said embossable material,
   forming an electroform of the image on the embossable material by electrodeposition of a metal thereon,
   applying a reinforcement layer over the said electroform,
   removing the said rigid cylinder to leave an image carrier comprising the embossable layer, the electroformed image and reinforcement layer,
   stripping the embossable layer from the image carrier to provide a plating mandrel of the electroformed image and reinforcement layer,
   forming a second electroform by electrodeposition of a metal on the interior of said electroformed image of the plating mandrel,
   removing the second electroform from the plating mandrel,
   then placing the said second electroform on a carrier to produce an embossing tool having an embossed monolithic imaged or patterned exterior surface.

10. The method of claim 9 wherein the image or pattern is placed onto the embossable material with an imaging tool having a curved image bearing stamping surface of a curvature matching the curvature of said embossable material layer.

11. The method of claim 9 wherein the embossable material layer on said rigid cylinder is polished prior to imparting the image thereto.

12. The method of claim 9 wherein prior to imparting the image a thin layer of metal is applied to the embossable material layer on said rigid cylinder.

13. The method of claim 12 wherein the metal is silver.

14. The method of claim 9 wherein the carrier is a metal cylinder.

15. The method of claim 9 wherein the carrier is a plurality of cylinder elements.

* * * * *

UNITED STATES PATENT AND TRADEMARK OFFICE
CERTIFICATE OF CORRECTION

PATENT NO.   : 4,923,572
DATED        : May 8, 1990
INVENTOR(S)  : John Watkins, Ramon Magee and Arthur Doerflinger It is certified that error appears in the above-identified patent and that said Letters Patent is hereby corrected as shown below:

Column 4, line 34, "4,190,893" should be -- 4,790.893 --

Signed and Sealed this

Ninth Day of July, 1991

Attest:

HARRY F. MANBECK, JR.

*Attesting Officer*           *Commissioner of Patents and Trademarks*